(12) United States Patent
Lehman et al.

(10) Patent No.: US 11,128,533 B2
(45) Date of Patent: *Sep. 21, 2021

(54) SYSTEM AND METHOD FOR COMMISSIONING A NETWORK ELEMENT

(71) Applicant: Level 3 Communications, LLC, Broomfield, CO (US)

(72) Inventors: Bernie C. Lehman, Aurora, CO (US); Erik W. McLeod, Longmont, CO (US)

(73) Assignee: Level 3 Communications, LLC, Broomfield, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/942,426

(22) Filed: Jul. 29, 2020

(65) Prior Publication Data

US 2020/0358654 A1 Nov. 12, 2020

Related U.S. Application Data

(63) Continuation of application No. 16/535,478, filed on Aug. 8, 2019, now Pat. No. 10,735,264, which is a continuation of application No. 15/349,664, filed on Nov. 11, 2016, now Pat. No. 10,382,273.

(60) Provisional application No. 62/280,954, filed on Jan. 20, 2016.

(51) Int. Cl.
*H04L 12/24* (2006.01)
*H04L 29/08* (2006.01)
*H04M 3/24* (2006.01)

(52) U.S. Cl.
CPC ........ *H04L 41/0886* (2013.01); *H04L 41/082* (2013.01); *H04L 41/0806* (2013.01); *H04L 41/22* (2013.01); *H04L 67/06* (2013.01); *H04L 67/10* (2013.01); *H04M 3/244* (2013.01)

(58) Field of Classification Search
CPC ............. H04L 41/0886; H04L 41/0806; H04L 41/082; H04L 41/22; H04L 67/06; H04L 67/10; H04M 3/244
See application file for complete search history.

(56) References Cited

U.S. PATENT DOCUMENTS

| 7,924,706 | B1 | 4/2011 | Roberson |
| 2005/0013259 | A1 | 1/2005 | Papoushado et al. |
| 2005/0220075 | A1 | 10/2005 | Bouchat |
| 2007/0070917 | A1 | 3/2007 | Maliya |

(Continued)

*Primary Examiner* — Arvin Eskandarnia
*Assistant Examiner* — Chhian (Amy) Ling (57) ABSTRACT

Systems, methods, and non-transitory computer-readable storage media which have instructions stored for execution on a processor, for automating the commissioning of a transport network element within a network. A system configured according to this disclosure can be an Automated Commissioning Tool which can initiate communications with a network element on the network. The Automated Commissioning Tool can then retrieve updated firmware corresponding to the network element and configure the network element to have the updated firmware. Finally, the Automated Commissioning Tool can determine, from a network plan, a first port on the network element which is to be connected via a cross-connect to a second port on the network element and establish the cross-connect on the network element. At this point the network element may be commissioned to operate as a transport network element within the network.

18 Claims, 6 Drawing Sheets

(56) References Cited

U.S. PATENT DOCUMENTS

| | | |
|---|---|---|
| 2012/0324105 A1 | 12/2012 | Wall et al. |
| 2013/0326029 A1 | 12/2013 | Flynn |
| 2014/0092903 A1 | 4/2014 | Maes |
| 2014/0313935 A1* | 10/2014 | Koziy .................... H04L 49/40 370/254 |
| 2017/0207972 A1 | 7/2017 | Lehman et al. |
| 2019/0363939 A1 | 11/2019 | Lehman |

* cited by examiner

SYSTEM AND METHOD FOR COMMISSIONING A NETWORK ELEMENT

BACKGROUND

1. Technical Field

The present disclosure relates to commissioning a network element to transport data within a network.

2. Introduction

Computer networks are formed by linking together computers, servers, other computing equipment using networking elements to transport the data on the network. While some networking elements (such as routers and switches) have many ports through which they can transport data, other networking elements may only have a single input port and a single output port. However, regardless of the size and complexity of the network elements being used to transport data in the network, installing and configuring the network elements can be a difficult process. For example, adding a network element to a network can be a time consuming process requiring multiple people and systems. Generally, the installation process involves an initial field installation so the network element (NE) can communicate with the network, then remotely testing and configuring of the NE by a test engineer while the field technician remains onsite, at the end of which the NE will be commissioned to transport data on the network.

Similarly, sometimes the overall plan and configuration of the network changes, which in turn forces updates and changes to the NEs. When these network updates occur, any individual switch, router, or other NE affected by the change must be individually updated.

While the amount of human time spent configuring NEs to transport data on the network can be substantial, it does not necessarily lead to higher quality or fewer configuration errors. Instead, errors are often introduced into the overall system by requiring so much human interaction. The present disclosure addresses these and other deficiencies in the current commissioning process.

SUMMARY

Disclosed are systems, methods, and non-transitory computer-readable storage media for configuring a Network Element (NE) to transport data within a network (i.e., commissioning an NE to become a transport NE). For example, a system configured according to this disclosure can be an Automated Commissioning Tool (ACT) which can initiate, at a server on a network, a communication channel with a NE on the network. If the NE needs to be updated, the ACT can retrieve updated firmware corresponding to the NE, then use the communication channel to load the firmware update into the NE. The ACT can also determine, from a network plan, a first port on the NE which is to be connected via a cross-connect to a second port on the NE. The ACT can then establish, using the communication channel, the cross-connect on the NE, such that the NE is commissioned to operate as a transport NE within the network.

Consider the following example. A new NE is being installed, and a field technician sets up initial settings on the NE so the NE can communicate with the network. Some exemplary settings could include an initial IP address, a subset mask, and TID (Target Identifier, which is the unique name for the NE within the network). With the NE configured to begin communicating with the network, an automatic commissioning tool (ACT) is initiated to finish configuring the NE to transport data on the network. The ACT first establishes a communication channel to communicate with the NE, follows a series of steps and operations to configure the NE, and ultimately commissions the NE to operate as a transport NE within the network. If, at any point in the configuration process, the ACT determines that a step or process has not configured the NE correctly, or that the NE has not passed a test, the ACT can either rerun the step/test, or can issue a notification to a test engineer.

The communication channel may be established through various mechanisms. In one example, the ACT may initiate a direct communication channel with the NE. Such a direct communication channel could, for example, be created using an FTP (File Transfer Protocol) connection with the NE. In other configurations, the ACT initiates indirect communications with the NE through a NEMS (Network Element Management System). In most settings the NEMS is a tool which receives status updates from many NEs throughout the network. In the case where the ACT is communicating with a particular NE through the NEMS, the NEMS would act as a relay for the ACT.

If the firmware of the NE needs to be updated or changed, the ACT can retrieve a different firmware configuration for the NE. The different firmware can be, for example, an updated version of the firmware previously on the NE. In other circumstances, the different firmware can be particular to a specific need or requirement for the NE. The firmware can be retrieved from memory or data storage within the ACT, or can be retrieved from a database containing firmware and/or software for many NEs on the network. The different/updated firmware can then be uploaded into the NE using the communication channel the ACT establishes with the NE.

The ACT can also determine, using a network plan, how the NE fits into the overall network. More specifically, the ACT uses the network plan to identify which ports on the NE will be used to carry traffic for the network. For example, the network plan can specify that data received on a first port of the NE needs to be output on a second port of the NE, and vice versa. To fulfill the network plan, the ACT can therefore identify that a communication connection is required to link the two ports, thereby allowing network traffic to flow between them. This connection, from a first port to a second port and vice versa, is referred to as a "cross-connect." Having determined that a cross-connect is required, the ACT can then establish the cross-connect, with the result being that the NE is enabled (or "commissioned") to transport network traffic between the first port and the second port.

DETAILED DESCRIPTION

Disclosed are systems, methods, and non-transitory computer-readable storage media for configuring a Network Element (NE) to transport data within a network (i.e., commissioning an NE to become a transport NE). For example, a system configured according to this disclosure can be an Automated Commissioning Tool (ACT) which can initiate, at a server on a network, a communication channel with a NE on the network. If the NE needs to be updated, the ACT can retrieve updated firmware corresponding to the NE, then use the communication channel to load the firmware update into the NE. The ACT can also determine, from a network plan, a first port on the NE which is to be connected via a cross-connect to a second port on the NE. The ACT can then establish, using the communication channel, the cross-connect on the NE, such that the NE is commissioned to operate as a transport NE within the network.

In a first example, a new NE is being installed, and a field technician sets up initial settings on the NE so the NE can communicate with the network. Some exemplary settings could include an initial IP address, a subset mask, and TID (Target Identifier, which is the unique name for the NE within the network). With the NE configured to begin communicating with the network, an automatic commissioning tool (ACT) is initiated to finish configuring the NE to transport data on the network. The ACT first establishes a communication channel to communicate with the NE, follows a series of steps and operations to configure the NE, and ultimately commissions the NE to operate as a transport NE within the network. If, at any point in the configuration process, the ACT determines that a step or process has not configured the NE correctly, or that the NE has not passed a test, the ACT can either rerun the step/test, or can issue a notification to a test engineer.

In a second example, a NE has existed within the network for a period of time, but has not previously carried network traffic. Then an overall network plan is modified, with the result that the NE will need to be configured to carry network traffic according to the updated network plan. In such circumstances, the ACT could be initiated to configure the NE to transport data on the network (i.e., commission the NE as a transport NE). As in the previous example, the ACT can first establish a communication channel to communicate with the NE, then follow a series of steps and operations to configure the NE, and ultimately commission the NE to operate as a transport NE within the network.

Figure 2A:
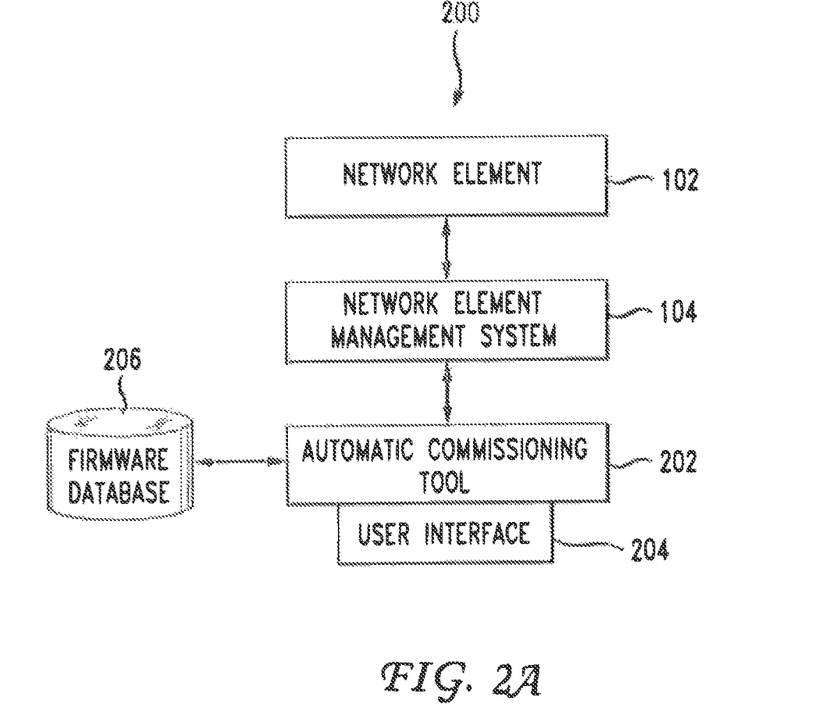
FIG. 2A illustrates a system architecture, where communications between an Automatic Commissioning Tool and a Network Element occur through a Network Element Management System.
Figure 2B:
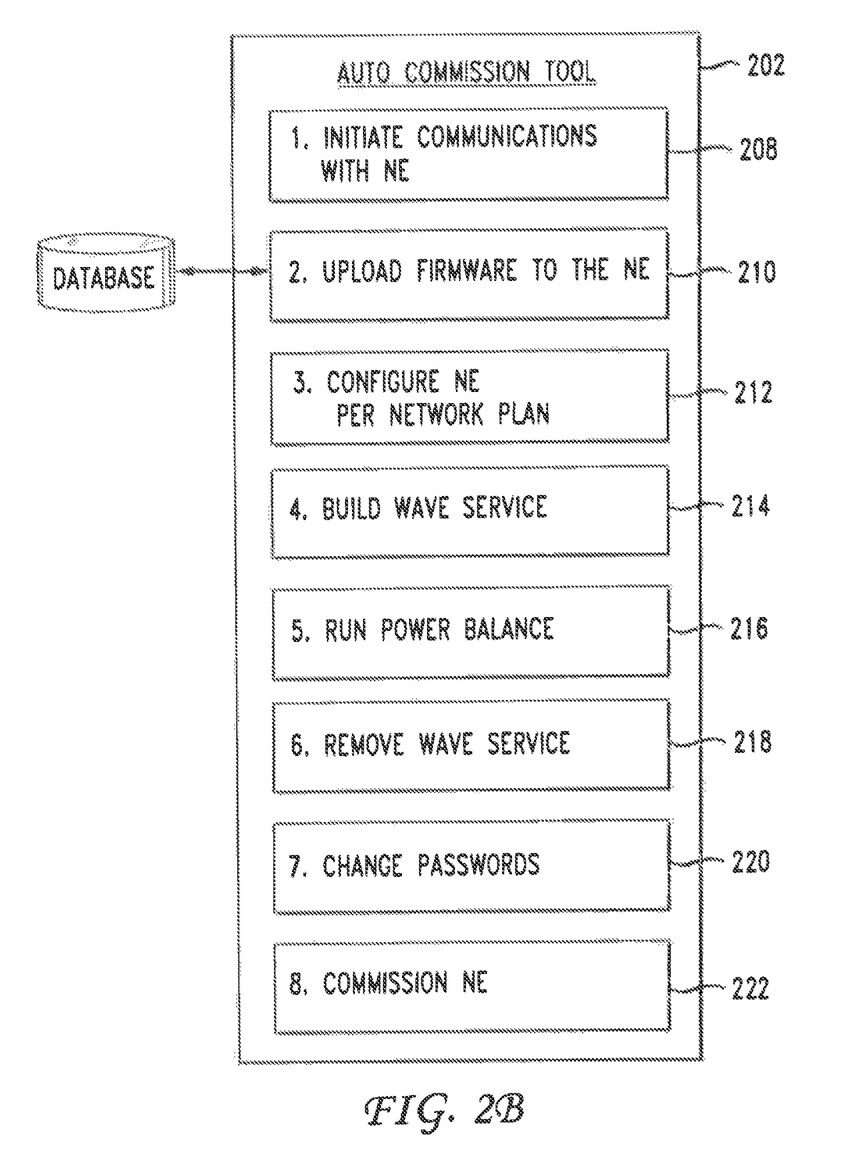
FIG. 2B illustrates exemplary steps the Automatic Commissioning Tool can take to configure, and ultimately commission, a Network Element to carry network traffic.
Figure 3:
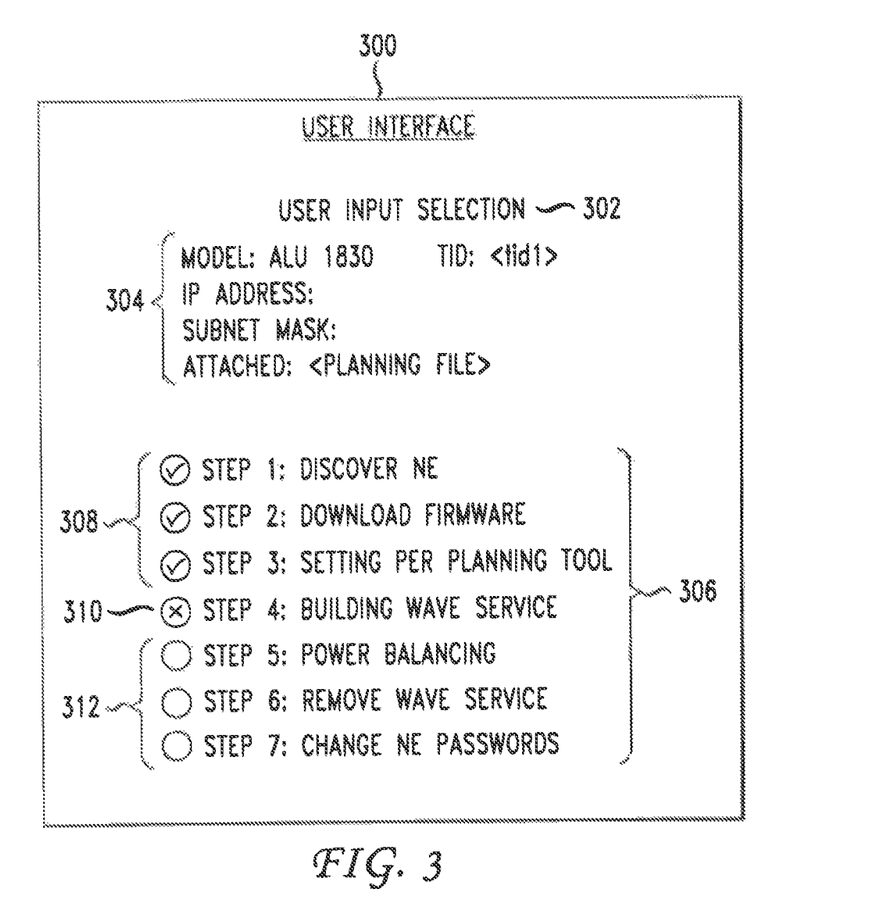
FIG. 3 illustrates an example graphical user interface which a user can use to monitor the Automatic Commissioning Tool as a Network Element is being configured.
Figure 4:
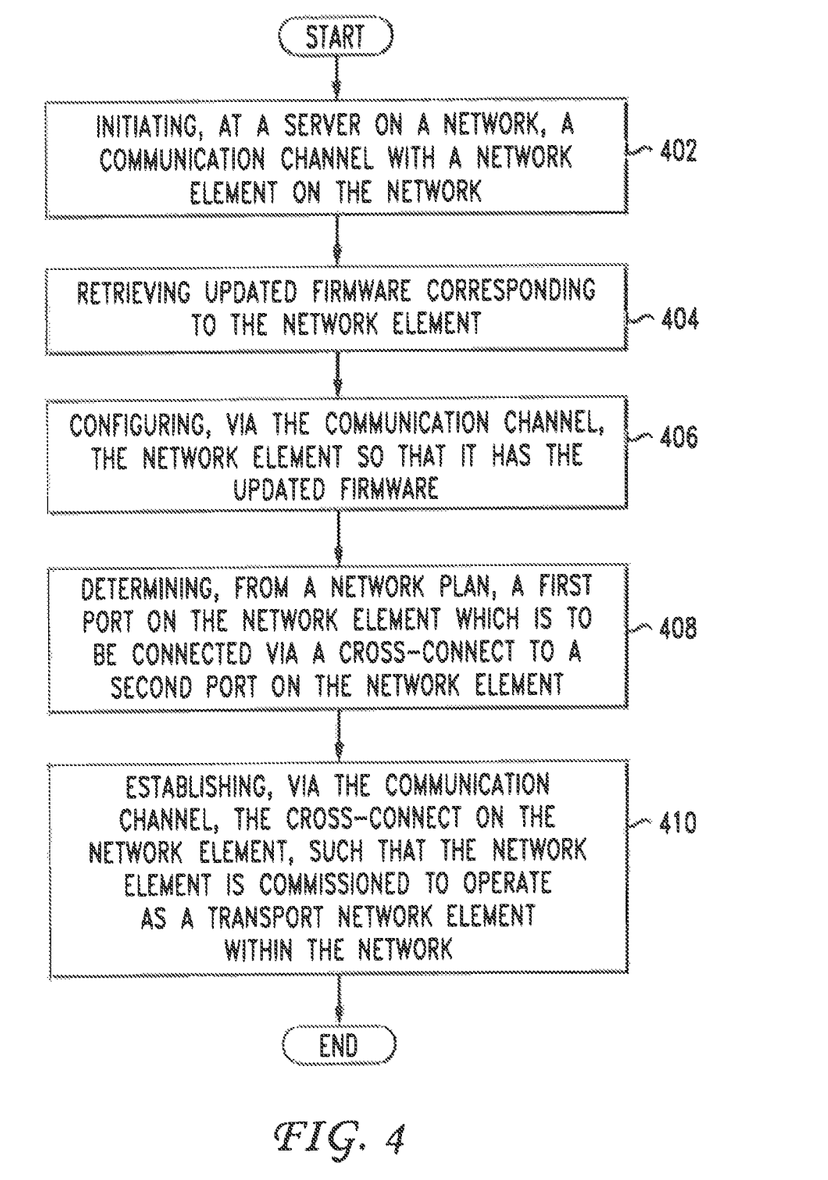
FIG. 4 illustrates an exemplary method embodiment.

This disclosure describes how the ACT initiates communications, configures, and ultimately commissions a NE to carry traffic in a network. First, an overview of a network element, and how a cross-connect operates, is provided in FIGS. 1A-1B. Next, an overview of the Automatic Commissioning Tool (ACT) and its role in commissioning a transport NE, is provided in FIGS. 2A-2B. FIG. 3 provides an example of a user interface for operating and monitoring the ACT, while FIG. 4 provides an exemplary method embodiment. Finally, FIG. 5 describes an exemplary computer system/architecture which can be used to perform the method embodiment and can also be used to enable systems configured according to the concepts disclosed herein. The disclosure now turns to FIG. 1.

Figure 1A:
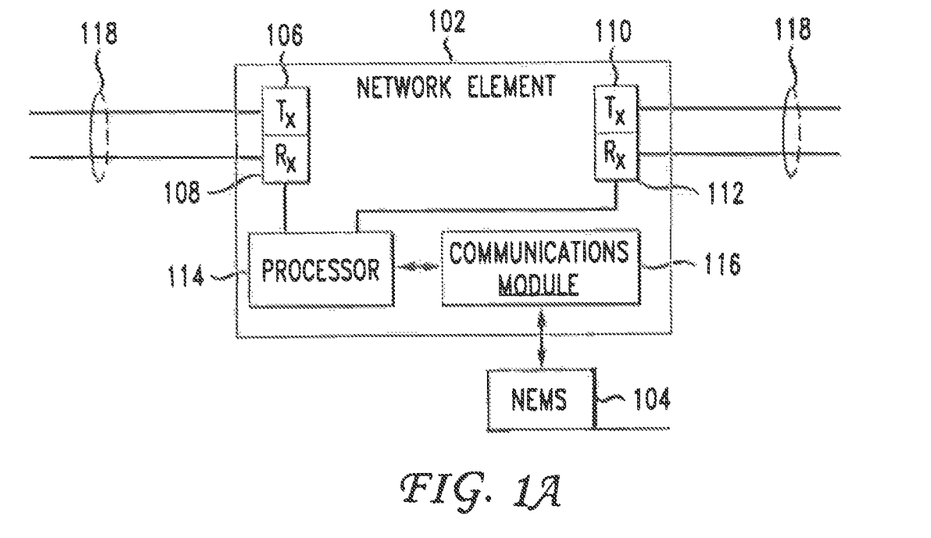
FIG. 1A illustrates an example network element which has not yet been configured to carry traffic on a network.

FIG. 1A illustrates an example NE 102 which has not yet been configured to carry traffic on a network. The NE 102 is physically connected to a network with wires (or cables) 118, which connect to specific ports on the NE 102. In this example, two ports are illustrated—one on the left, having Tx 106 and Rx 108 components, and one on the right having similar Tx 110 and Rx 112 components. In this illustration, each respective pair of Tx/Rx components form a single port, with the Tx components 106, 110 transmitting data away from the NE 102 and the Rx components 108, 112 receiving data at the NE 102. This is exemplary only. In reality ports can contain multiple pins and connections used for transmitting and/or receiving data.

Each port in the NE 102 is connected to a processor 114 (or other integrated circuit), which in turn is connected to a communications module 116. As data is received or transmitted on the ports, the processor 114 can report the traffic to the communications module 116, which in turn can forward the data to a NEMS (Network Element Management System) 104. The NEMS 104 is a networking tool which allows for monitoring of NEs in a network by collecting data from the NEs, aggregating the data, and presenting the compiled data in an understandable manner. While each NEMS can vary, communication with thousands of NEs in the network would not be unusual. Thus, the NEMS 104 can monitor the flow of traffic across NEs and identify faults and failures transporting data across the network.

However, in FIG. 1A, the NE 102 is not configured to transport data on the network. For example, no connection is present from the left Rx component 108 to any other communication component in the NE 102, and likewise the right Rx component 112 has no connection. Therefore, any data received by the NE 102 at either Rx component 108, 112 will not be passed on to a further destination. In addition, the Tx components 106, 110 are not connected to a data source, resulting in the NE 102 of FIG. 1A not being capable of transmitting data.

Figure 1B:
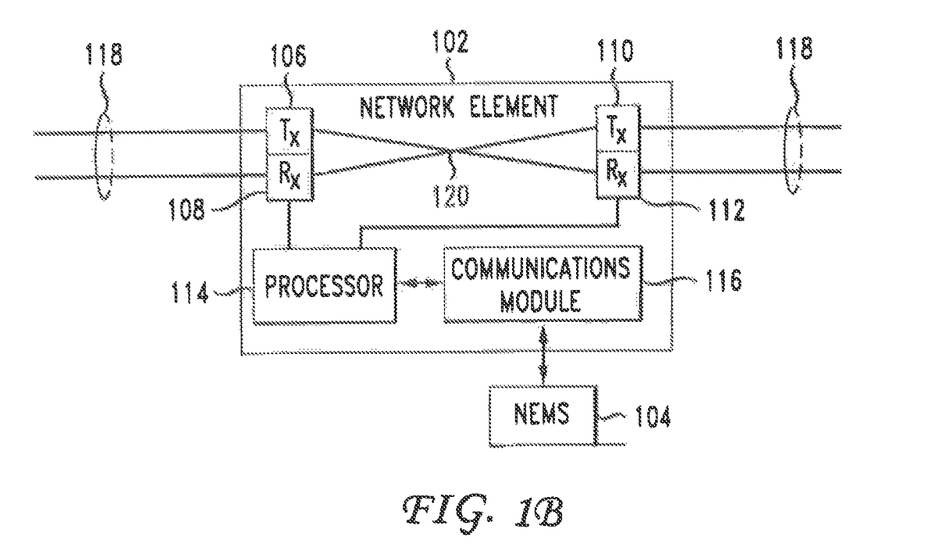
FIG. 1B illustrates the network element of FIG. 1A with a cross-connect allowing network traffic to flow between ports.

FIG. 1B illustrates the network element 102 of FIG. 1A with the addition a cross-connect 120. The cross-connect allows network traffic to flow between ports by passing data received on the left port at Rx component 108 to the right port at Tx component 110. Similarly, data received on the right port at Rx component 112 is passed to the left port Tx component 106. This allows data received by the network element 102 to be forwarded to designated destinations, with the NE 102 of FIG. 1B being described as a "commissioned" transport network element. FIGS. 2A and 2B next describe how the cross-connect is allocated using an Automatic Commissioning Tool.

FIG. 2A illustrates a system architecture 200, where communications between an Automatic Commissioning Tool (ACT) 202 and a Network Element (NE) 102 occur, at least in part, using a Network Element Management System (NEMS) 202. As described above, the NE 102 can be any network equipment or item, from a server to a multiplexor (aka a MUX), involved in the communication of data in some form of network, and the NEMS 104 receives data from the NE 102 (and other network elements) regarding traffic and status conditions.

However, the NE 102 illustrated in FIG. 2A is similar to that of FIG. 1A. That is, while it 102 is configured to perform basic communications with the network and the NEMS 104 (having been configured with basic network settings, such as an IP address, a subnet mask, and/or a TID (Target Identifier, the unique name given to each system when it is installed in the network. This name identifies the particular network element to which each command is directed.), the NE 102 of FIG. 2A is not configured to transport data on the network. More specifically, the NE 102 of FIG. 2A is not configured to move data from port-to-port, thereby acting as a transport network element. To enable the NE 102 to transport data, an Automatic Commissioning Tool (ACT) 202 is used.

The ACT 202 can configure the NE 102 to operate as a transport NE by: (1) verifying the NE firmware is current, and if not current, uploading current firmware into the NE 102; (2) identifying how the NE 102 should be configured by consulting a network plan; (3) configuring the NE 102 to comply with the network plan; (4) testing the configuration; and/or (5) commissioning the NE 102 as a transport NE. Additional details regarding these steps are discussed with respect to FIG. 2B.

While the ACT 202 can proceed through the various configuration steps automatically, in some configurations the ACT 202 can be operated and/or monitored by a user through a user interface 204. For example, in one configuration, a test engineer receives a notification of a new NE in the network and initiates configuration of the NE by the ACT 202 through interactions with the user interface 204. In another configuration, the ACT 202 receives a notification of a non-configured NE 102 in the network and automatically begins configuring the NE 102 (without instruction from the user). However, when an error in the automatic configuration occurs, a notification is presented to the user via a user interface 204.

Whereas the NEMS 104 is a passive tool made for listening to NEs and reporting on their status, the Automatic Commissioning Tool (ACT) 202 can reach out to databases to discover information, then cause configuration changes to NEs based on that information. For example, the ACT 202, when a new NE 102 is discovered, can identify if the firmware on the NE 102 is current by first determining what firmware is on the NE 102, then comparing that to a firmware database 206. The firmware database 206 can contain firmware for many different types, versions, and configurations of NEs used in the network. If the firmware on the NE 102 is up-to-date, the ACT 202 can move to the next step in the configuration process. If, however, the firmware is out-of-date, the ACT 202 can download the updated firmware from the database 206, then upload the updated firmware into the NE 102.

While the example is given of installing or updating firmware to a current or most recent version is provided, in other cases there may be multiple versions of firmware available for specific circumstances. The ACT 202 can ensure that the firmware loaded on the NE 102 is the correct firmware for the current situation. Similarly, while the example of firmware and a firmware database 206 is provided, in other circumstances software can be modified (and software databases accessed) to ensure software on the NE 102 is correct.

While FIG. 2A illustrates the NEMS 104 and the ACT 202 as being separate tools or operational blocks, it is noted that the ACT 202 may be implemented as one or more operational routines of a hardware device with computer executable instructions to perform the routines. The hardware device may be a server, a personal computer, a tablet, or collection or distribution of such devices. The routines may also be implemented in hardware or firmware. From a functionality standpoint, the NEMS 104 has traditionally been associated with monitoring and communications from many NEs, whereas the ACT 202 is primarily focused on configuring and testing individual NEs. However, a NEMS 104 configured to perform the functionality of the ACT 202 is within the scope of this disclosure, or vice versa. Similarly, databases, such as the firmware database 206 or a software database, may be remotely located from the ACT 202 as separate databases, or may be contained in either the NEMS 106 or the ACT 108.

FIG. 2B illustrates exemplary steps the Automatic Commissioning Tool 202 can take to configure, and ultimately commission, a Network Element (NE) 102 to carry network traffic on the network. The ACT 202 performs a series of steps 208-222 to configure and ultimately commission the NE 102 as a transport NE. In one configuration, each step is initiated, completed and verified prior to a subsequent step beginning. In other configurations, certain steps can be performed in alternative orders, and/or in parallel with other steps.

The ACT 202 first initiates communications 208 with the NE 102. This may be because the NE 102 is new to the network and needs to be initialized, or because the network (and a plan for the network) has changed and the NE 102 needs to be reconfigured to carry traffic. Any form of communication channel with the NE 102 is within the scope of this disclosure. One example of a communication channel is the use of a FTP (File Transfer Protocol) connection which allows the ACT 108 to directly communicate with the NE 104. An FTP connection can allow the ACT 108 to change settings, update software, update firmware, etc., via a remote connection of the FTP channel.

The ACT 202 next determines if any changes to the firmware (or software) of the NE 102 are required. If so, the ACT 202 can download updated (or different) firmware for the NE 102 from a database, then upload the firmware 210 to the NE 102. The uploading of the firmware can use the communications channel previously established to upload the firmware into the NE 102. Determining if a change to the firmware/software of the NE is required can, for example, be based on the firmware of the NE 102 being improper for the current application/use of the NE 102 within a network plan, the firmware being out of date, etc. To make such determinations, the ACT 202 can be supplied data such as the part number, serial number, unit type, etc. of the NE 102 (from the NEMS 104, or through the user interface 204). Alternatively, the ACT 202 can automatically discover the identification information of the NE 102 through the communications channel. With the information regarding the version of the firmware, the part number, etc., the ACT 202 can compare that data to a table, chart, or other values to determine if the NE 102 is configured correctly. This comparison can, for example, involve referencing one or more databases where firmware/software information about the NEs is stored to determine if the NE 102 is correctly configured.

With the firmware/software of the NE 102 correctly configured, the ACT 202 also begins preparing/configuring the NE 102 according to a network plan 212. The network plan provides details on how the various network elements interact to transport data between the servers, computer, and other computing devices of the network. The ACT 202 uses the network plan to establish cross-connects within the NEs and to ensure the data flows through the network as designed. For example, if the network plan indicates that the NE 102 will transport data from port JJ to port KK, the ACT 202 will need to establish a cross-connect between ports JJ and KK. However, the ACT 202 may also need to initialize, prepare, or otherwise "turn-on" ports JJ and KK (or the NE 102 generally) to fulfill their functions.

With the NE 102 configured with the correct firmware and the NE 102 configured according to the network plan, the NE 102 should be ready to begin transporting data on the network once a cross-connect is established on the NE. Steps 4-7 214-220 are associated with testing otherwise ensuring that the NE 102 is properly configured. In certain configurations, the ACT 202 can bypass or otherwise not perform these steps and immediately commission the NE 102.

The first testing step is to build a wave service 214. A wave service is a temporary path to emulate a cross-connect to-be-placed in the NE 102. The ACT 202 uses the network plan to determine what cross-connects will exist within the NE 102 when the NE 102 is commissioned, then builds a temporary path (the wave service) to emulate/mimic the cross-connect(s). With the wave service in place, the ACT 202 performs power balancing 216 on the NE 102. When the power balancing 216 is complete, the ACT 202 removes the wave service 218 (meaning the temporary cross-connect(s) are removed). With the testing 214-218 complete and the NE 102 having passed all of the tests, the passwords can be changed 220 on the NE. In many cases, the ACT 202 sets the passwords to predetermined strings. In other cases, the ACT 202 can set the passwords to a random or otherwise non-predetermined value and record the passwords within the ACT 202, the NEMS 104, and/or communicate the passwords to a user.

With the NE 102 set up and configured to have correct firmware settings (step 2 210) and according to the network plan (step 3 212), and having passed testing/password setting steps 4-7 214-220, the NE 102 is ready to be commissioned 222 to transport data on the network. With the official commissioning, any cross-connects which the network plan describes as being present between ports of the NE 102 are established and data can begin to be conveyed across the NE 102. In addition, the NE 102 is officially noted as transporting data (i.e., commissioned), information which will be conveyed to the NEMS 104 for official monitoring. If the NE 102 has not completed any of the steps in the process, or if there are errors in the configuration and testing process, a notification can be communicated to a user, and commissioning of the NE 102 as a transport NE can be delayed. Exemplary notifications can include a message communicated via a graphical user interface, an email, a text/SMS message, placing the NE 102 on a list of incorrectly configured NEs, etc.

FIG. 3 illustrates an example graphical user interface 300 by which a user can interface with the ACT 202, the graphical user interface 300 being a component of the user interface 204 illustrated in FIG. 2A. The graphical user interface 300 illustrated represents what a user operating the ACT 202 is currently viewing 302, as well as specific information 304 associated with the NE 102. Exemplary information 304 displayed can include the model number of the NE 102, the IP address assigned to the NE 102, the subnet mask assigned to the NE 102, as well as a network planning file containing the network plan. In addition, the user can view the current status of the ACT 202 as the steps 208-222 are performed. For example, as illustrated, the graphical user interface 300 illustrates steps 1-3 as complete with a check mark 308. Step 4 has failed, as represented by the "X" 310, and steps 5-7 have not yet been performed (as indicated by the blank graphical representation 312). Other possible symbols which can be graphically displayed include a symbol for a currently pending process, a symbol indicating a step is being re-run, a number of repeated iterations performed, an expected time until the commissioning is complete, alerts, etc.

Having disclosed some basic system components and concepts, the disclosure now turns to the exemplary method embodiment shown in FIG. 4. For the sake of clarity, the method is described in terms of an exemplary system/Automatic Commission Tool 202 as shown in FIGS. 2A and 2B, configured to practice the method. The steps outlined herein are exemplary and can be implemented in any combination thereof, including combinations that exclude, add, or modify certain steps.

The ACT 202 initiates, at a server on a network, a communication channel with a network element on the network (402). One non-limiting example of such a communication channel is an FTP connection between the ACT 202 and the NE. The ACT 202 then retrieves updated firmware corresponding to the network element (404) and configures, via the communication channel, the network element so that the network element has the updated firmware (406). In one configuration, the firmware can be retrieved from within the ACT 202, whereas in other configurations the firmware can be contained within a separate/remotely located database. Such a database can hold multiple firmware versions corresponding to different types, models, and configurations of network elements. The ACT 202 determines, from a network plan, a first port on the network element which is to be connected via a cross-connect to a second port on the network element (408). With this information, the ACT 202 establishes, via the communication channel, the cross-connect on the network element, such that the network element is commissioned to operate as a transport network element within the network (410).

In various embodiments, the method embodiment can further include testing the NE configuration by using a wave service, where a temporary cross-connect is established to allow for power balancing, performing the power balancing, then removing the wave service after the NE has passed the power balancing tests. In such configurations, the ACT 202 can perform the power balancing, or the power balancing can be performed using a NEMS 104 or other outside mechanisms. The method can also include changing the passwords on the NE, and/or outputting notifications, alerts, and other information to a user via a user interface, including a graphical user interface.

It is further noted that the steps 402-410 being performed by the ACT 202 can occur in series or in parallel with one another according to the system configuration. If, for example, the configuration requires that the steps be performed in series, the system 202 can require that each step be completed (or pass a test for threshold performance) before moving on to the next step. If any step doesn't reach a pass state, the ACT 202 can issue a notification to a user (such as a test engineer) that the step did not pass or that the NE needs additional attention. If the configuration allows the steps to be performed in parallel, a similar notification can be sent in the event of a step failure, but the system 202 may continue performing any steps which are not dependent on the failed step.

While the exemplary method describes establishing a single cross-connect, the network plan may call for additional ports within the NE to be connected via separate cross-connects. In such circumstances, the method can further include: determining, from a network plan, a third port on the network element which is to be connected via a second cross-connect to a fourth port on the network element; and establishing, via the communication channel, the second cross-connect on the network element, such that additional data can be communicated between the third port and the fourth port. The establishing of this second cross-connect can occur in parallel with the establishing of the first cross-connect, or can occur at a separate time.

Figure 5:
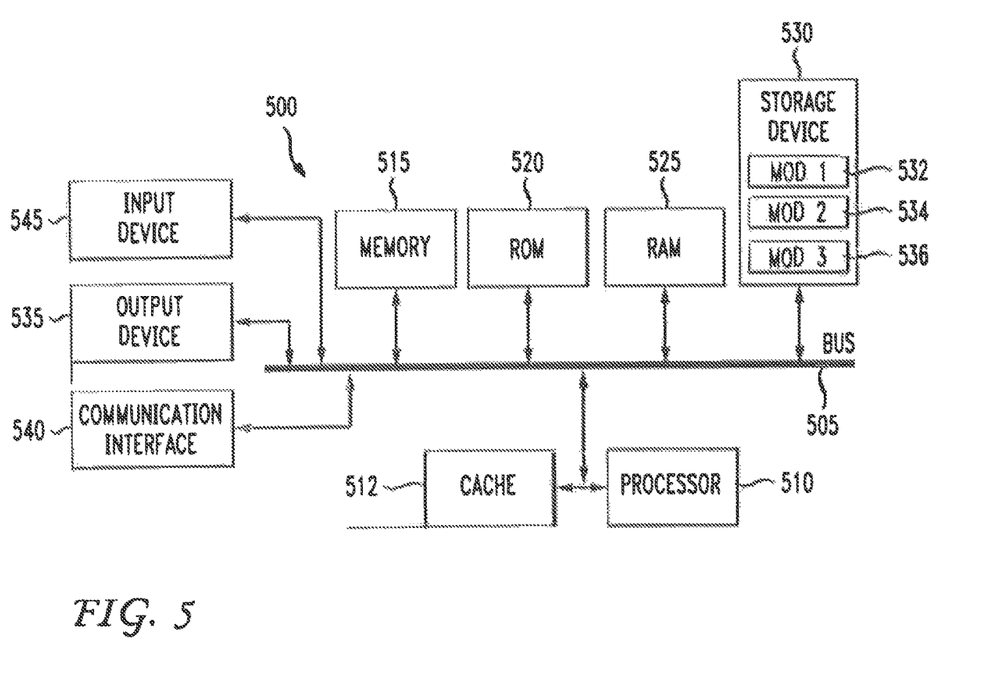
FIG. 5 illustrates an example system embodiment.

Having discussed a system configured to perform the concepts and principles disclosed herein, the disclosure now turns a description of a computing system which can be employed by any of the devices referenced herein. With reference to FIG. 5, an exemplary system 500 includes a general-purpose computing device 500, including a processing unit (CPU or processor) 510 and a system bus 505 that couples various system components including the system memory 515 such as read only memory (ROM) 520 and random access memory (RAM) 525 to the processor 510. The system 500 can include a cache 512 of high speed memory connected directly with, in close proximity to, or integrated as part of the processor 510. The system 500 copies data from the memory 515 and/or the storage device 530 to the cache 512 for quick access by the processor 510. In this way, the cache 512 provides a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. It can be appreciated that the disclosure may operate on a computing device 500 with more than one processor 510 or on a group or cluster of computing devices networked together to provide greater processing capability. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

The system bus 505 may be any of several types of bus structures including a memory bus or memory controller, a peripheral bus, and a local bus using any of a variety of bus architectures. A basic input/output (BIOS) stored in ROM 520 or the like, may provide the basic routine that helps to transfer information between elements within the computing device 500, such as during start-up. The computing device 500 further includes storage devices 530 such as a hard disk drive, a magnetic disk drive, an optical disk drive, tape drive or the like. The storage device 530 can include software modules 532, 534, 536 for controlling the processor 510. Other hardware or software modules are contemplated. The storage device 530 is connected to the system bus 505 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 510, bus 505, display 535, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 530, other types of computer-readable media which can store data that are accessible by a computer, such as magnetic cassettes, flash memory cards, digital versatile disks, cartridges, random access memories (RAMs) 525, and read only memory (ROM) 520, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 545 represents any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems enable a user to provide multiple types of input to communicate with the computing device 500. The communications interface 540 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 510. The functions these blocks represent may be provided through the use of either shared or dedicated hardware, including, but not limited to, hardware capable of executing software and hardware, such as a processor 510, that is purpose-built to operate as an equivalent to software executing on a general purpose processor. For example the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 520 for storing software performing the operations described below, and random access memory (RAM) 525 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 500 shown in FIG. 5 can practice all or part of the recited methods, can be a part of the recited systems, and/or can operate according to instructions in the recited tangible computer-readable storage media. Such logical operations can be implemented as modules configured to control the processor 510 to perform particular functions according to the programming of the module. For example, FIG. 5 illustrates three modules Mod1 532, Mod2 534 and Mod3 536 which are modules configured to control the processor 510. These modules may be stored on the storage device 530 and loaded into RAM 525 or memory 515 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to the commissioning of any type of network element, and should not be limited to particular types of network elements. Various modifications and changes may be made to the principles described herein without following the example embodiments and applications illustrated and described herein, and without departing from the spirit and scope of the disclosure.

What is claimed:

1. A system comprising:
a processor; and a
computer-readable storage medium having instructions stored which, when executed by the processor, cause the processor to perform operations comprising:
identify a network element within a network;
initiate a file transfer protocol connection with the network element on the network;
update firmware on the network element;
identify, using a network plan, how the network element should be configured to carry the traffic within the network to yield a planned configuration, wherein the establishment of the cross-connect is performed according to the planned configuration, wherein the network plan is stored in a remote database; and
establish, via the file transfer protocol connection and based on the network element having the updated firmware, a cross-connect between two ports on the network element such that the network element is commissioned to carry traffic within the network.

2. The system of claim 1, the computer-readable storage medium having additional instructions stored which, when executed by the processor, cause the processor to perform operations comprising, prior to the establishment of the cross-connect:
build a temporary cross-connect on the network element;
power balance the network element using the temporary cross-connect; and
remove the temporary cross-connect.

3. The system of claim 1, wherein the cross-connect comprises a first connection between a first receive element of a first port and a second transmit element of a second port and a second connection between a first transmit element of the first port and a second receive element of the second port.

4. The system of claim 1, the computer-readable storage medium having additional instructions stored which, when executed by the processor, cause the processor to perform operations comprising:
update a graphical user interface configured to output notifications regarding the establishment of the cross-connect on the network element.

5. The system of claim 1, wherein the network element comprises the two ports and a plurality of additional ports.

6. The system of claim 1, wherein updating the firmware on the network element further comprises:
download updated firmware for the network element from a database; and
upload the updated firmware to the network element via the file transfer protocol connection.

7. The system of claim 1, wherein the network element is commissioned to carry traffic within the network responsive to the establishment of the cross-connect.

8. The system of claim 1, the computer-readable storage medium having additional instructions stored which, when executed by the processor, cause the processor to perform operations comprising:
determine a third port on the network element which is to be connected via a second cross-connect to a fourth port on the network element; and
establish the second cross-connect on the network element such that additional data can be communicated between the third port and the fourth port.

9. A method comprising:
identifying; at a server on a network, a network element within the network;

initiating a file transfer protocol connection with the network element on the network;

updating firmware on the network element;

identify, using a network plan, how the network element should be configured to carry the traffic within the network to yield a planned configuration, wherein the establishment of the cross-connect is performed according to the planned configuration, wherein the network plan is stored in a remote database; and establishing, via the file transfer protocol connection and based on the network element having the updated firmware, a cross-connect between two ports on the network element such that the network element is commissioned to carry traffic within the network.

10. The method of claim 9, further comprising determining a third port on the network element which is to be connected via a second cross-connect to a fourth port on the network element; and establishing the second cross-connect on the network element such that additional data can be communicated between the third port and the fourth port.

11. The method of claim 9, further comprising, prior to the establishment of the cross-connect:

building a temporary cross-connect on the network element;

power balancing the network element using the temporary cross-connect; and removing the temporary cross-connect.

12. The method of claim 9, wherein the cross-connect comprises a first connection between a first receive element of a first port and a second transmit element of a second port and a second connection between a first transmit element of the first port and a second receive element of the second port.

13. The method of claim 9, further comprising:

updating a graphical user interface configured to output notifications regarding the establishment of the cross-connect on the network element.

14. The method of claim 9, wherein the network element comprises the two ports and a plurality of additional ports.

15. The method of claim 9, wherein updating the firmware on the network element comprises:

downloading updated firmware for the network element from a database; and uploading the updated firmware to the network element via the file transfer protocol connection.

16. The method of claim 9, wherein the network element is commissioned to carry traffic within the network responsive to the establishing of the cross-connect.

17. A computer-readable storage device having instructions which, when executed by a computing device, cause the computing device to perform operations comprising:

initiate, at a server on a network, communications with a network element on the network; update firmware on the network element;

determine, via the communications, a current configuration of the network element;

identify a difference between the current configuration of the network dement and a planned configuration of the network element, wherein the difference prevents the network element from carrying traffic on the network, wherein the identifying of the difference further comprises retrieve a network plan identifying connections between network elements in the network and identifying port connections between ports of each network element in the network element, wherein the network plan is stored in a remote database; and initiate, via the communications and based on the network element having the updated firmware, a cross-connection between two ports on the network element to correct the difference, such that the network element is configured to carry traffic within the network.

18. The computer-readable storage device of claim 17, wherein the identifying of the difference further comprises: compare the current configuration to the network plan.

* * * * *